United States Patent
Lu et al.

(10) Patent No.: US 12,151,726 B2
(45) Date of Patent: Nov. 26, 2024

(54) TACS BASED METHOD FOR TRAIN INTERVAL PROTECTION CONTROL, AND APPARATUS FOR METHOD

(71) Applicant: CASCO SIGNAL LTD., Shanghai (CN)

(72) Inventors: Yiran Lu, Shanghai (CN); Haigui Xu, Shanghai (CN); Wei Feng, Shanghai (CN); Xiaoyong Wang, Shanghai (CN); Yanyang Xing, Shanghai (CN)

(73) Assignee: CASCO SIGNAL LTD., Shanghai (CN)

( * ) Notice: Subject to any disclaimer, the term of this patent is extended or adjusted under 35 U.S.C. 154(b) by 208 days.

(21) Appl. No.: 18/003,846

(22) PCT Filed: Sep. 22, 2021

(86) PCT No.: PCT/CN2021/119546
§ 371 (c)(1),
(2) Date: Dec. 29, 2022

(87) PCT Pub. No.: WO2022/257298
PCT Pub. Date: Dec. 15, 2022

(65) Prior Publication Data
US 2023/0249727 A1    Aug. 10, 2023

(30) Foreign Application Priority Data

Jun. 8, 2021    (CN) .......................... 202110635583.5

(51) Int. Cl.
*B61L 27/20*    (2022.01)
*B61L 23/14*    (2006.01)

(52) U.S. Cl.
CPC ............... *B61L 27/20* (2022.01); *B61L 23/14* (2013.01)

(58) Field of Classification Search
CPC ................................. B61L 27/20; B61L 23/14
See application file for complete search history.

(56) References Cited

U.S. PATENT DOCUMENTS 10,077,060 B2 *   9/2018   Tonguz ................... B61L 19/06
10,259,478 B1 *   4/2019   Gao ........................ B61L 27/20
(Continued)

FOREIGN PATENT DOCUMENTS

CN    109677456 A    4/2019
CN    110696876 A    1/2020
(Continued)

*Primary Examiner* — Long T Tran
(74) *Attorney, Agent, or Firm* — HSML P.C.

(57) ABSTRACT

The present disclosure relates to a train autonomous control system (TACS) based method for train interval protection control, and an apparatus for the method. The method includes: step one: receiving, by a carborne controller (CC), a train operation command sent by an automatic train supervision (ATS) system to obtain a movement mission; step two: calculating, by the CC, a train guaranteed zone in real time according to information of train localization, car characteristics, and carborne controller characteristics; step three: calculating, by the CC, track resources required to be used in combination with current mission information according to the train guaranteed zone, and requesting to a wayside information control (WSIC) for information of collided trains occupying these track resources; and step four: sending, by the WSIC, a list of the collided trains on the track resources required to be used to the CC according to information of the track resources required to be occupied by a train on a whole line. Compared to the prior art, the present disclosure has the advantages of high operation efficiency, communication resource saving, reliability, safety, etc.

10 Claims, 3 Drawing Sheets

(56) References Cited

U.S. PATENT DOCUMENTS

| | | | | |
|---|---|---|---|---|
| 2004/0249571 A1* | 12/2004 | Blesener | ............... | B61L 29/28 340/907 |
| 2021/0107537 A1* | 4/2021 | Ross | ............... | B61L 25/026 |
| 2021/0107546 A1* | 4/2021 | Ross | ............... | B61L 27/04 |
| 2021/0279488 A1* | 9/2021 | Dolberg | ............... | G06N 3/08 |
| 2021/0354566 A1* | 11/2021 | Ben-Ari | ............... | B60T 1/10 |

FOREIGN PATENT DOCUMENTS

| | | |
|---|---|---|
| CN | 111776013 A | 10/2020 |
| CN | 112061182 A | 12/2020 |
| CN | 112249097 A | 1/2021 |
| CN | 113264086 A | 8/2021 |

* cited by examiner

TACS BASED METHOD FOR TRAIN INTERVAL PROTECTION CONTROL, AND APPARATUS FOR METHOD

TECHNICAL FIELD

The present disclosure relates to the field of rail transit signal control, in particular to a train autonomous control system (TACS) based method for train interval protection control, and an apparatus for the method.

BACKGROUND

At present, a communication based train control (CBTC) system is used as a mainstream urban rail transit signal system in China, which is essentially a signal system mainly based on train-ground communication. A conventional CBTC signal system with lots of ground equipment as a train control core has lower train-ground communication efficiency. In a train control system based on continuous bidirectional train-ground communication, line and switch resources are managed in a packaged manner, resulting in low space utilization. For the realization of interval protection, wayside equipment collects location and status information of trains on a line in a unified way and then provide the information to the trains after calculation, resulting in low time utilization.

Compared to the conventional CBTC system, a train autonomous control system (TACS) based on train-to-train communication, as the representative of a new-generation signal system, takes train active resource management and active blocking as the core, and carborne equipment actively applies for resources according to an operation plan and a current location and autonomously calculates a movement authority according to a resource obtaining condition and a location of an adjacent train. Through such function transfer from a wayside to a train, the wayside equipment of the system is simplified, and the efficiency of bifurcation, junction and turnaround are significantly improved. The TACS controls the resources of trains and lines in a more refined way from time and space dimensions, making the use safer and more efficient. As the core control function of the TACS, direct communication between trains is to achieve train safety interval protection. For the train operating autonomously, its concern is the nearest upstream or downstream train, and the adjacent train serves as an obstacle in combination with the operational direction of the train for movement authority calculation.

Because the number of trains operating in the line is uncertain, the arrangement order and relative distance between the trains are also changing. For each train operating autonomously, the train that needs to communicate with it must be determined by a safe and reliable method to ensure that the train occupies the line resources in a certain order and completes the corresponding mission of the train.

By retrieval, a train management method based on train-to-train communication is disclosed in the China Patent Publication No. CN202010865191.3. When a communication fault occurs in a train-to-train communication based train set, the train-to-train communication based train set sends fault information to a ground controller, and the ground controller generates a train activation identification command according to the communication fault information, and sends the train activation identification command to the train-to-train communication based train set; and the train-to-train communication based train set switches a train-to-train communication driving mode to an autonomous driving mode according to the activation identification command. However, this technology takes into account the problem of control and management of faulty trains, and the communication based train set only includes a main train and a front train, and does not control and manage real-time interval protection between the trains.

SUMMARY

To overcome the above defects existing in the prior art, an objective of the present disclosure is to provide a reliable, secure and efficient train autonomous control system (TACS) based method and apparatus for train interval protection control, which realize interval protection between trains.

The objective of the present disclosure may be achieved through the following technical solution:

According to a first aspect of the present disclosure, provided is a TACS based method for train interval protection control, including the following steps:

step one: receiving, by a carborne controller (CC), a train operation command sent by an automatic train supervision (ATS) system to obtain a movement mission;

step two: calculating, by the CC, a train guaranteed zone in real time according to information of train localization, car characteristics, and carborne controller characteristics;

step three: calculating, by the CC, track resources required to be used in combination with current mission information according to the train guaranteed zone, and requesting to a wayside information control (WSIC) for information of collided trains occupying these track resources;

step four: sending, by the WSIC, a list of the collided trains on the track resources required to be used to the CC according to information of the track resources required to be occupied by a train on a whole line.

step five: when there is no valid train information in the list of the collided trains, recognizing, by the CC, that there is no collided train on the track resources required to be occupied; when there is valid train information in the list of the collided trains, initiating, by the CC, communication between the trains according to the train information in the list of the collided trains; and after the communication is established, negotiating, by the CC, with a CC of a related train for interval protection, and reporting a negotiation status to the WSIC;

step six: after the WSIC receives a negotiation success status, authorizing the CCs to directly negotiate about occupation of the track resources between the trains; and step seven: when the track resources required to be used by the CC no longer intersect with the track resources required to be used by the corresponding collided train, ending, by the CC, the communication and negotiation with the CC of the corresponding collided train, and reporting the condition to the WSIC.

As a preferred solution, the train guaranteed zone is a location that a train is currently guaranteed not to cross.

As a preferred solution, when the train has a fault, faulty train interval protection is taken over by the WSTC, specifically as follows:

a location of the train is reported to the WSTC via a backup localization system (BLS) arranged on the faulty train; and the WSTC receives the train movement mission sent by the ATS system and replaces the CC to perform the train interval protection.

As a preferred solution, the fault of the train is a fault of the CC.

According to a second aspect of the present disclosure, provided is an apparatus for the TACS based method for train interval protection control, including a WSIC, an object controller (OC), a wayside train control (WSTC), an ATS system, a CC, a BLS, and a balise, where the BLS is arranged on a train; the WSIC communicates with all train CCs; every two of the ATS system, the WSIC, and the WSTC are communicatively connected to each other; and the WSIC is connected to the OC.

As a preferred solution, the ATS system is responsible for supervising and controlling train operation, and has the functions of train tracking operation, alarming and event reporting, operation adjustment, and operation control.

As a preferred solution, the WSIC is responsible for line resource allocation and recovery, train sequence management, and signal and switch control; and the WSTC is responsible for handling temporary speed restriction, managing and tracking a faulty train, and replacing the faulty train to perform interval protection, resource application, and release.

As a preferred solution, the OC is configured for implementing status collection and drive of wayside equipment;
the CC is configured to perform line resource request and release according to a plan, and to actively perform train control;
the balise is configured to provide location information in combination with a line map; and
the BLS is configured to provide a corresponding train identity (ID) and train location information to the wayside train control according to obtained balise information.

According to a third aspect of the present disclosure, provided is an electronic device, including a memory, a processor, and a computer program stored on the memory and executable on the processor, where the processor is configured to perform, when executing the program, the method.

According to a fourth aspect of the present disclosure, provided is a computer readable storage medium having a computer program stored thereon, where the computer program, when executed by a processor, causes the processor to perform the method.

Compared to the prior art, the present disclosure has the following advantages:

1) The train interval protection control technology in the present disclosure reduces the intermediate processing steps and improves the operation efficiency of the system through protection of a time interval of direct information interaction between the trains.

2) The train interval protection control technology in the present disclosure initiates the information interaction between the trains only when certain conditions are met, namely, it is necessary to establish the communication between the trains, thus saving communication resources of the system.

3) According to the train interval protection control technology in the present disclosure, the demand for interval protection is actively initiated by the train, which ensures higher safety compared to a passive protection mechanism.

4) The train interval protection control technology in the present disclosure may still ensure efficient mixed operation of the faulty train and the normal train in case of the fault, thereby improving the reliability of the system.

DETAILED DESCRIPTION OF THE EMBODIMENTS

The technical solutions in the embodiments of the present invention will be clearly and completely described below with reference to the accompanying drawings in the embodiments of the present disclosure. Apparently, the described embodiments are part rather than all of the embodiments of the present disclosure. All other embodiments obtained by those of ordinary skill in the art based on the embodiments of the present disclosure without creative efforts should fall within the scope of protection of the present disclosure.

A train autonomous control system (TACS) based method for train interval protection control in the present disclosure aims to manage an adjacent relationship of trains on a line and realize more efficient and safer tracking between the trains on the line through direct information interaction between the trains.

Figure 1:
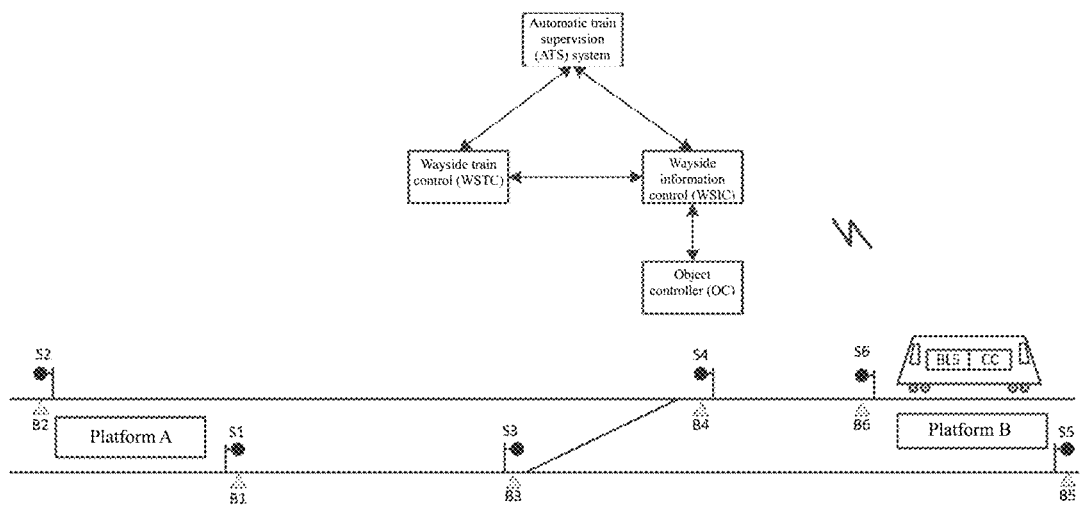
FIG. 1 is a schematic diagram of a train autonomous control system (TACS) architecture.

As shown in FIG. 1, the train autonomous control system based on train-to-train communication mainly includes a wayside information control (WSIC), a wayside train control (WSTC), an object controller (OC), an automatic train supervision (ATS) system, a carborne controller (CC), a backup localization system (BLS), and a balise. The ATS system is responsible for supervising and controlling train operation, and has the functions of train tracking operation, alarming and event reporting, operation adjustment, operation control, etc.; the WSIC is responsible for line resource allocation and recovery, train sequence management, and signal and switch control; the WSTC is mainly responsible for handling temporary speed restriction, managing and tracking a faulty train, and replacing the faulty train to perform interval protection, resource application, and release; the OC is mainly configured for implementing status collection and drive of wayside equipment; the CC is configured to perform line resource request and release according to a plan, and to actively perform train control to realize a train safety protection function and a train autonomous driving function; the balise is configured to provide location information in combination with a line map; and the BLS is mainly configured to provide a corresponding train identity (ID) and train location information to the wayside train control according to obtained balise information, so as to achieve location tracking of a degraded train, where the BLS is arranged on the train and is configured to complete operation of the degraded train in cooperation with the WSTC.

Figure 2:
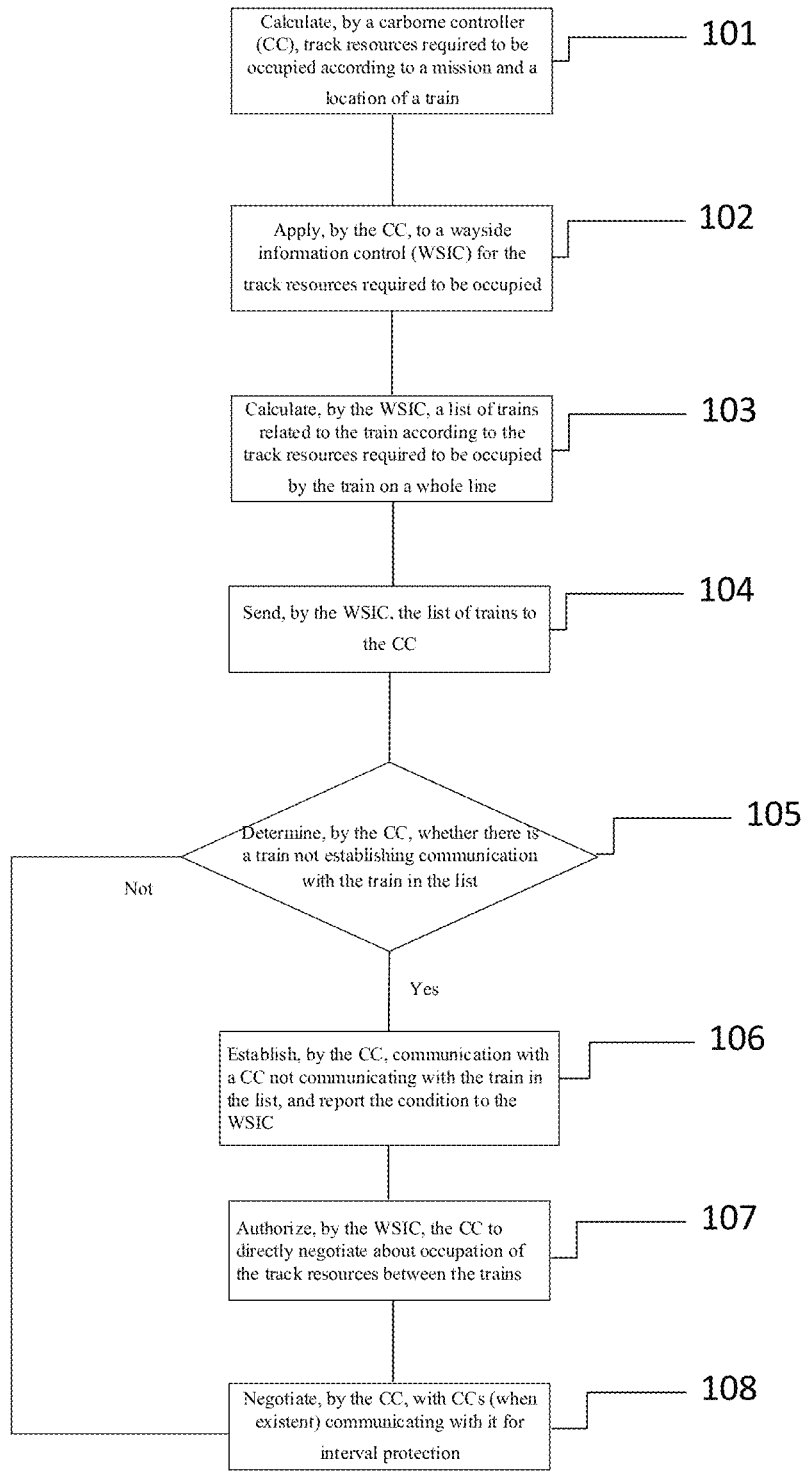
FIG. 2 is a work flow chart of a method in the present disclosure.
Figure 3:
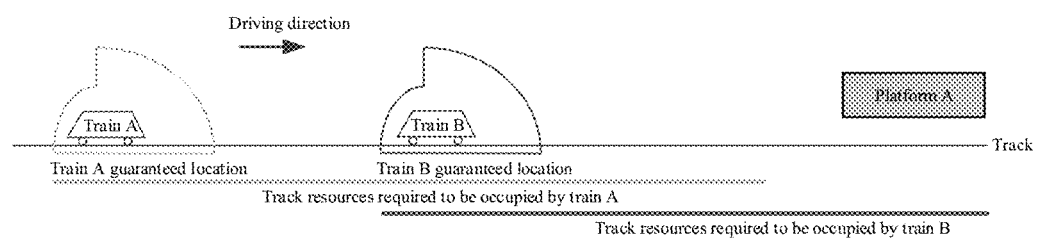
FIG. 3 is a schematic principle diagram a of the method in the present disclosure.
Figure 4:
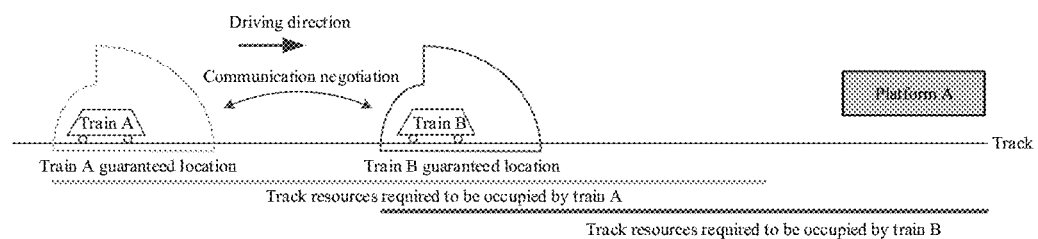
FIG. 4 is a schematic principle diagram b of the method in the present disclosure.

As shown in FIG. 2, the TACS based method for train interval protection control includes the following steps:

101): receiving, by a CC, an operation mission and a location of a train sent by the ATS system, and calculating track resources required to be occupied;

102): applying, by the CC (of a train A), to a WSIC for the track resources required to be occupied, as shown in FIG. 3;

103): calculating, by the WSIC, a list of collided trains whose track resources intersect with the track resources required to be occupied according to information of the track resources required to be occupied by the train on a whole line;

104): sending, by the WSIC, the list of the collided trains related to the track resources applied by the train to the CC;

105): after the CC receives the list of the collided trains, comparing the train with a train that already communicates with it currently, determining whether there is a collided train that does not establish communication yet, if so, proceeding to step 106), otherwise, proceeding to step 107);

106): actively establishing, by the CC (of the train A), communication with a CC of a collided train (a train B) that does not establish communication yet, and reporting the condition to the WSIC, as shown in FIG. 4;

107): authorizing, by the WSIC, the CCs (of the trains A and B) to directly negotiate about occupation of corresponding tracks; and 108): negotiating, by the CC, with all CCs (when existent) that already establish communication for interval protection.

Figure 5:
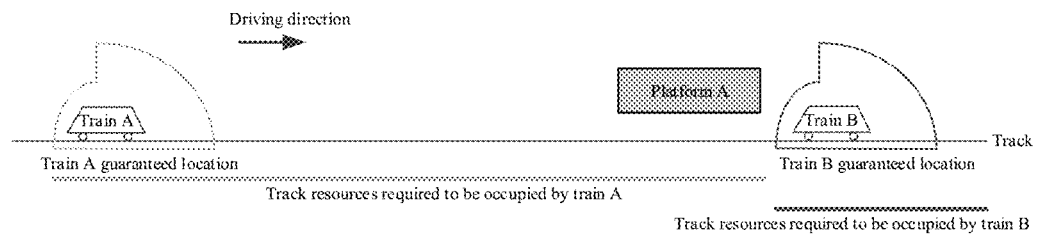
FIG. 5 is a schematic principle diagram c of the method in the present disclosure.

When the train (the train B) that already establishes the communication is not within a range of the track resources required to be occupied by the CC (of the train A), the CC (of the train A) cuts off the communication and reports the condition to the WSIC, as shown in FIG. 5.

The CC uploads a status of the train to the WSTC in real time. In case of a CC fault, the WSTC applies to the WSIC for a control authority of the train. After successful application, the WSIC authorizes the WSTC to obtain the control authority, and sends a guaranteed location reported by the CC to the WSTC. At this time, the BLS uploads a location of the train to the WSTC when the train passes the balise. The WSTC calculates the train guaranteed location of the faulty train on a basis of the location information provided by the BLS. The ATS system sends the operation mission of the train to the WSTC, and the WSTC calculates the track resources required to be occupied by the faulty train on a basis of the guaranteed location of the faulty train and the operation mission of the train, and replaces the CC to perform interval protection between the trains.

An electronic device in the present disclosure includes a central processing unit (CPU) which may perform various appropriate actions and processes according to computer program instructions stored in a read-only memory (ROM) or loaded into a random access memory (RAM) from memory cells. Various programs and data required for device operation may also be stored in the RAM. The CPU, the ROM, and the RAM are connected to one another via a bus. An input/output (I/O) interface is also connected to the bus.

A plurality of components in the device are connected to the I/O interface, including: an input unit, such as a keyboard or a mouse; an output unit, such as various types of displays or loudspeakers; a memory cell, such as a magnetic disk or a compact disc; and a communication unit, such as a network card, a modem, or a wireless communication transceiver. The communication unit allows the device to exchange information/data with other device through a computer network such as the Internet and/or various telecommunication networks.

An embodiment of the present disclosure provides a computer program product. The computer program product includes a computer program stored on a non-transient computer-readable storage medium. The computer program includes program instructions. When the program instructions are executed by a computer, the computer can execute the methods provided by the embodiments of the above methods. Program codes for implementing the method in the present disclosure may be written in any combination of one or more programming languages. These program codes may be provided to a processor or controller of a general purpose computer, a special purpose computer, or other programmable data processing apparatus, such that the program codes, when executed by the processor or controller, cause the processor or controller to perform the functions/operations specified in a flowchart and/or block diagram. The program codes may be completely or partially executed on a machine, partially executed on the machine as an independent software package and partially executed on a remote machine or completely executed on the remote machine or a server.

The above is only the specific implementation of the present disclosure, but the scope of protection of the present disclosure is not limited thereto. Any of those skilled in the art may easily think of various equivalent modifications or substitutions within the technical scope of the present disclosure, and these modifications or substitutions should be included in the scope of protection of the present disclosure. Therefore, the scope of protection of the present disclosure should be subject to the appended claims.

The invention claimed is:

1. A train autonomous control system (TACS) based method for train interval protection control, comprising the following steps:

step one: receiving, by a carborne controller (CC), a train operation command sent by an automatic train supervision (ATS) system to obtain a movement mission;

step two: calculating, by the CC, a train guaranteed zone in real time according to information of train localization, car characteristics, and carborne controller characteristics;

step three: calculating, by the CC, track resources required to be used in combination with current mission information according to the train guaranteed zone, and requesting to a wayside information control (WSIC) for information of collided trains occupying these track resources;

step four: sending, by the WSIC, a list of the collided trains on the track resources required to be used to the CC according to information of the track resources required to be occupied by a train on a whole line;

step five: when there is no valid train information in the list of the collided trains, recognizing, by the CC, that there is no collided train on the track resources required to be occupied; when there is valid train information in the list of the collided trains, initiating, by the CC, communication between the trains according to the train information in the list of the collided trains; and after the communication is established, negotiating, by the CC, with a CC of a related train for interval protection, and reporting a negotiation status to the WSIC;

step six: after the WSIC receives a negotiation success status, authorizing the CCs to directly negotiate about occupation of the track resources between the trains; and step seven: when the track resources required to be used by the CC no longer intersect with the track resources required to be used by the corresponding collided train, ending, by the CC, the communication and negotiation with the CC of the corresponding collided train, and reporting the condition to the WSIC.

2. The TACS based method for train interval protection control according to claim 1, wherein the train guaranteed zone is a location that a train is currently guaranteed not to cross.

3. The TACS based method for train interval protection control according to claim 1, wherein when the train has a fault, faulty train interval protection is taken over by the WSTC, specifically as follows:

a location of the train is reported to the WSTC via a backup localization system (BLS) arranged on the faulty train; and the WSTC receives the train movement mission sent by the ATS system and replaces the CC to perform the train interval protection.

4. The TACS based method for train interval protection control according to claim 3, wherein the fault of the train is a fault of the CC.

5. An apparatus for the TACS based method for train interval protection control according to claim 1, comprising a WSIC, an object controller (OC), a wayside train control (WSTC), an ATS system, a CC, a BLS, and a balise, wherein the BLS is arranged on a train; the WSIC communicates with all train CCs; every two of the ATS system, the WSIC, and the WSTC are communicatively connected to each other; and the WSIC is connected to the OC.

6. The apparatus according to claim 5, wherein the ATS system is responsible for supervising and controlling train operation, and has the functions of train tracking operation, alarming and event reporting, operation adjustment, and operation control.

7. The apparatus according to claim 5, wherein the WSIC is responsible for line resource allocation and recovery, train sequence management, and signal and switch control; and the WSTC is responsible for handling temporary speed restriction, managing and tracking a faulty train, and replacing the faulty train to perform interval protection, resource application, and release.

8. The apparatus according to claim 5, wherein the OC is configured for implementing status collection and drive of wayside equipment;

the CC is configured to perform line resource request and release according to a plan, and to actively perform train control;

the balise is configured to provide location information in combination with a line map; and the BLS is configured to provide a corresponding train identity (ID) and train location information to the wayside train control according to obtained balise information.

9. An electronic device, comprising a memory, a processor, and a computer program stored on the memory and executable on the processor, wherein the processor is configured to perform, when executing the program, the steps of the TACS based method for train interval protection control according to claim 1.

10. A computer readable storage medium having a computer program stored thereon, wherein the computer program, when executed by a processor, causes the processor to perform the steps of the TACS based method for train interval protection control according to claim 1.

* * * * *